United States Patent
Haritou et al.

(10) Patent No.: US 9,227,782 B2
(45) Date of Patent: Jan. 5, 2016

(54) DOUBLE SKIN TANK LINING WITH INTERSTITIAL SPACER

(75) Inventors: Christos S. Haritou, Redcar (GB); Alan Fada, Washington (GB); Ian Gimiel Fada, South Shields (GB); John Harry Rhodes, Hartlepool (GB); Julie Rhodes, legal representative, Hartlepool (GB)

(73) Assignees: Christos Sotirious Haritou, Cleveland (GB); Alan Fada, Tyne & Wear (GB)

( * ) Notice: Subject to any disclaimer, the term of this patent is extended or adjusted under 35 U.S.C. 154(b) by 826 days.

(21) Appl. No.: 12/443,346

(22) PCT Filed: Sep. 28, 2007

(86) PCT No.: PCT/GB2007/050592
§ 371 (c)(1),
(2), (4) Date: Dec. 7, 2009

(87) PCT Pub. No.: WO2008/038052
PCT Pub. Date: Apr. 3, 2008

(65) Prior Publication Data
US 2010/0075086 A1    Mar. 25, 2010

(30) Foreign Application Priority Data
Sep. 29, 2006  (GB) .................................. 0619254.6

(51) Int. Cl.
*B32B 3/24*     (2006.01)
*B65D 90/04*    (2006.01)
(Continued)

(52) U.S. Cl.
CPC .............. *B65D 90/503* (2013.01); *B32B 3/266* (2013.01); *B65D 90/046* (2013.01);
(Continued)

(58) Field of Classification Search
CPC .... B32B 3/266; B65D 90/503; B65D 90/047; B65D 88/1606; B65D 90/041; B65D 88/1625; B65D 90/046; Y10T 428/2835; Y10T 428/1383; Y10T 428/249983; Y10T 442/152; Y10T 442/176; Y10T 442/169
USPC ......... 428/36.7, 317.3, 172, 161, 34.1, 129.1; 220/62.11; 52/169.2; 442/31; 156/280
See application file for complete search history.

(56) References Cited

U.S. PATENT DOCUMENTS 3,971,075 A * 7/1976 Heinbaugh et al. .......... 52/169.7
4,613,922 A * 9/1986 Bachmann .................... 361/215
(Continued)

FOREIGN PATENT DOCUMENTS

DE    4009086 A1    9/1991
EP    0567383     *  4/1993
(Continued)

OTHER PUBLICATIONS

English machine translation of WO 02090101.*
(Continued)

*Primary Examiner* — Yan Lan
(74) *Attorney, Agent, or Firm* — MacMillan, Sobanski & Todd, LLC

(57) ABSTRACT

A lining system for lining a surface generates a fluid impervious lining and an interstitial space between said lining and said surface. The system includes a layer comprising a flexible material having an adhesive coating on each side thereof, a second layer of flexible material, and a spacing means to generate a gap between the first and second layers, the gap constituting the interstitial space, and a coating, the coating comprising a curable material which cures to form a hard fluid impervious coating.

16 Claims, 11 Drawing Sheets

(51) Int. Cl.
  *B65D 90/50*  (2006.01)
  *B32B 3/26*  (2006.01)

(52) U.S. Cl.
  CPC . *Y10T 428/1383* (2015.01); *Y10T 428/249983* (2015.04); *Y10T 428/2835* (2015.01); *Y10T 442/152* (2015.04); *Y10T 442/169* (2015.04); *Y10T 442/176* (2015.04)

(56) References Cited

U.S. PATENT DOCUMENTS

| | | |
|---|---|---|
| 5,314,735 A | 5/1994 | Kronberg |
| 5,904,265 A | 5/1999 | Zandbergen et al. |
| 6,139,938 A | 10/2000 | Lingle et al. |
| 2002/0020490 A1 | 2/2002 | Fitzgerald |
| 2004/0059036 A1* | 3/2004 | Gaveske ............... 524/445 |
| 2004/0170810 A1 | 9/2004 | Rasmussen |
| 2004/0194846 A1 | 10/2004 | Sone et al. |

FOREIGN PATENT DOCUMENTS

| | | |
|---|---|---|
| GB | 2413587 A | 11/2005 |
| WO | 02090101 A2 | 11/2002 |
| WO | 2006103479 A2 | 10/2006 |

OTHER PUBLICATIONS

Search Report for GB0718930.1 (Apr. 4, 2008).

* cited by examiner

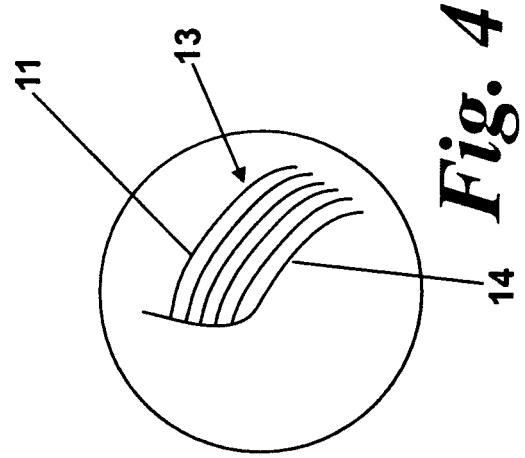
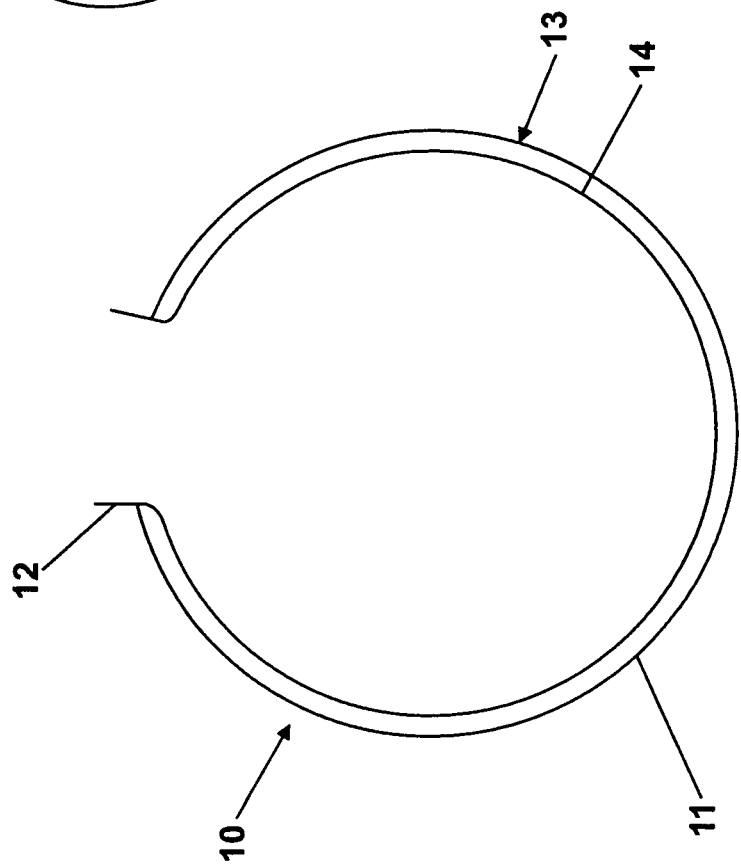

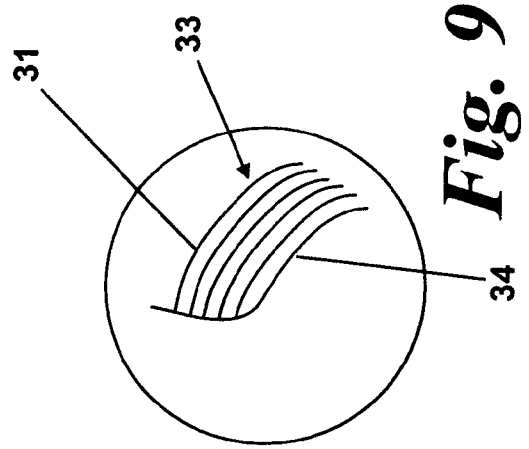
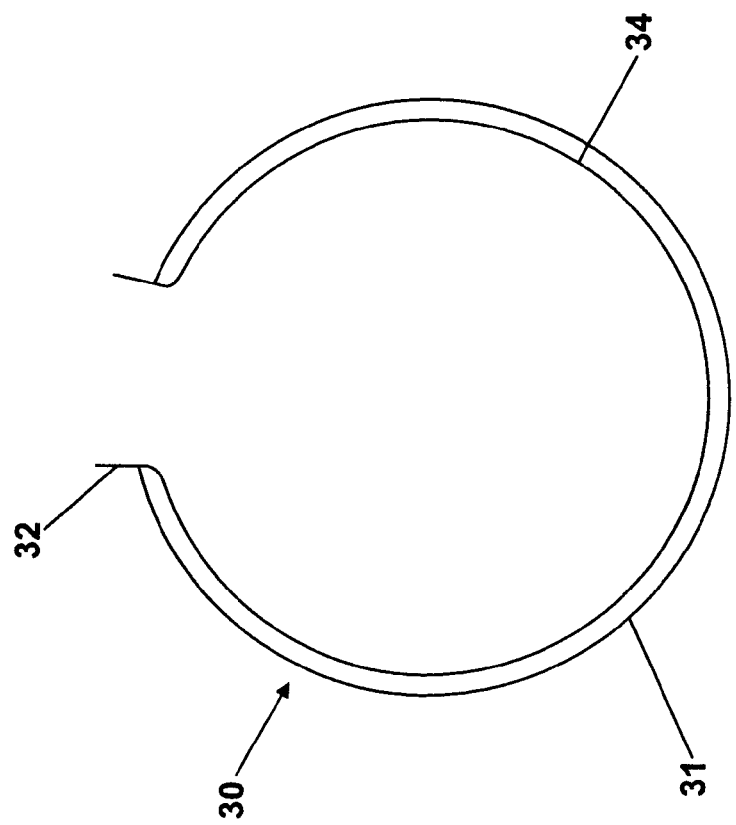

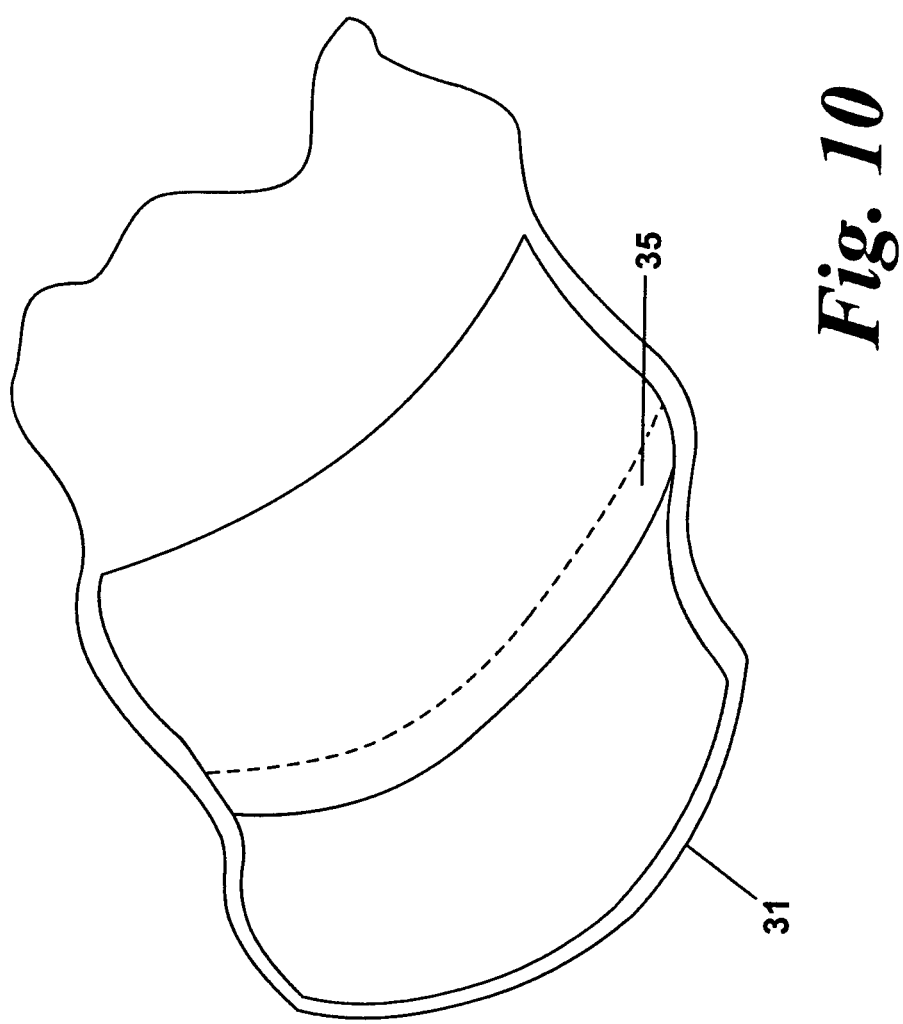

DOUBLE SKIN TANK LINING WITH INTERSTITIAL SPACER

CROSS REFERENCE TO RELATED APPLICATIONS

This application is the National Phase of International Application PCT/GB2007/050592 filed Sep. 28, 2007 which designated the U.S. and was published in English under PCT Article 21(2) on Aug. 28, 2003 as International Publication Number WO 2008/038052A1. PCT/GB2007/050592 claims priority to U.K. Application No. 0619254.6 filed Sep. 29, 2006. Thus, the subject nonprovisional application claims priority to U.K. Application No. 0619254.6 filed Sep. 29, 2006. The disclosures of both applications are incorporated herein by reference.

FIELD OF THE INVENTION

The present invention relates to tanks and the lining thereof to provide a monitorable interstitial space between an outer tank hull and an inner lining.

BACKGROUND OF THE INVENTION

Tanks are commonly used for storing fluids. Environmental damage may occur if a fluid storage tank leaks. Obviously the nature and extent of damage caused by leakage from a tank will depend on the nature of the fluid in the tank and the amount of leakage. Where tanks are above-ground, they can be monitored by visual inspection. However, in many circumstances fluid storage tanks are located underground. Underground fuel storage tanks are used at filling stations for the storage of petroleum products. Leakage of petroleum products from an underground storage tank might go unnoticed for many months, during which time water courses may be polluted, and soil may be contaminated. Furthermore, people and buildings in the vicinity may be endangered by the presence of highly flammable fuels in the ground.

Historically, underground fuel storage tanks were fashioned from a single skin of mild steel. Corrosion of such tanks was not a problem whilst petrol fuel contained lead, the lead acting as a corrosion inhibitor. However, in most countries lead is no longer present in petrol fuel. The resulting petrol fuel is corrosive of steel, and there have been a number of incidences of such tanks leaking fuel into the ground with consequent damaging effects. There is therefore a move to line underground fuel storage tanks with linings not susceptible to corrosion by the fuel destined to be stored in the tank.

If a double skinned tank contains an air gap between the outer tank wall and the interior lining, leakage from the tank can be monitored by various leak monitoring devices. One such leak monitoring device monitors a vacuum in the air gap. A change in pressure indicates an integrity failure in the inner lining or outer hull.

The replacement of an underground tank is a time consuming and expensive process, since in the case of a filling station, the cost of physically removing the tank from the ground is itself high, but more importantly whilst the tank is being replaced the fuel station must be closed, resulting in loss of revenue for the period of closure, and possible long-term loss of business due to customers going to other filling stations during the period of closure.

Re-lining existing underground tanks provides at least three benefits. First, the lining is selected so as not to be corrodible by the fuel. Second, if there is an interstitial space this space can be monitored to establish whether there is any leakage of fuel from the tank, and third, lining a tank can be accomplished more quickly than replacement of a tank.

The publication WO 00/32394 describes a method of lining a fuel storage tank in which a keying means is applied to the surface of a tank. A corrosion barrier is then applied to the keying means. An interstitial grid is then applied to the tank and pliable glass reinforced plastics material is laid onto the grid. The glass reinforced plastics material is then exposed to ultra violet rays to cure the material and form a hardened inner liner shell for the tank.

To line a tank following the method described in WO 00/32394 requires a team of men working for thirty to forty five days, with one man of the team working in the tank at any one time. Due to the toxic nature of the gases given off by the resins used in the laying up of the pliable glass reinforced plastics material onto the grid, and the ability of those gases to pass through the skin and into the bloodstream of humans, the length of time a worker may spend in the tank is severely limited, and special protective clothing must be worn and breathing apparatus used. Whilst in the tank the workers wear clothing that is impervious to the gases given off by the resins used in the laying up of the glass reinforced plastics material. However, the protective clothing available is only impervious to these gases for a limited period of time, after which the worker must come out of the tank, dispose of the protective clothing and be de-contaminated. The risk of hospitalisation resulting from exposure to noxious gases during the laying up the glass reinforced plastics material is significant.

Another apparatus and method of lining a tank is disclosed in GB 2413587. This apparatus requires the tank to be lined with a material having protrusions on one side, the free ends of which face the inner wall of the tank and are glued thereto. Seams between adjoining sections of material may be joined together, or a second layer of material may cover the first, with adjoining sections thereof being attached to each other to form a sealed lining. Whilst this re-lining apparatus and method provides for effective sealing and reduces the problems associated with working in a confined environment when exposed to noxious gases, performance of the method of re-lining is time consuming.

Another apparatus and method of lining a tank is disclosed in PCT/GB2006/050069. In this apparatus and method the tank is lined with a single layer of fluid impervious plastics material. An interstitial space exists between opposing faces of said wall and said plastics sheet which is monitored by a vacuum. This apparatus and method uses fewer and less costly materials than the method of GB 2413587, and the time required to perform the method is reduced. Nevertheless an apparatus and method yet more efficient would be desirable.

The apparatus and method of GB 0511243.8 (not published) provides an alternative apparatus and method for lining a tank which is less time consuming to install than those of GB 2413587 and GB 0522817.6 (not published). However, this particular apparatus is not suitable for use with liquids having high penetrability such as petrol.

Another apparatus and method of lining a tank is described in GB 0608233.3 (not published). This particular apparatus and method uses double sided sticky tape to attach the lining to the inner surface of the tank hull. One problem associated with this lining apparatus and method is that the weight of liquid in the tank may depress the fluid impervious layer such that the interstitial space is compromised.

It would therefore be desirable to provide an improved apparatus and method.

SUMMARY OF THE INVENTION

According to an aspect of the present invention there is provided a composite material as specified in claim 1.

According to another aspect of the invention there is provided a method of lining as specified in claim 23.

According to another aspect of the invention there is provided a fluid impervious lining system as specified in claim 19.

According to another aspect of the invention there is provided a tank as specified in claim 35.

The invention provides for the efficient lining of tanks so as to provide a lining which is impervious to fluids, including corrosive such as biofuels. Where a suitable fluid impervious payer such as aluminium foil is used, a barrier to fumes is provided. Further, an interstitial space is provided between the lining and the surface being lined. The interstitial space can be monitored. By monitoring the interstitial space it is possible to detect failure of either the lining or the surface which is lined.

The invention provides a fast and safe method of lining a tank. Further the use of the vacuum during application of the lining allows any faults in the lining to be identified and made good.

BRIEF DESCRIPTION OF THE DRAWINGS

In the drawings, which illustrate a preferred embodiment of the invention, and are by way of example:

FIG. 3 is a schematic illustration of a tank lined with the material illustrated in FIGS. 1 and 2;

FIG. 4 is an exploded view of the termination of the lining around a man-way;

FIG. 8 is a schematic illustration of a tank lined with the material illustrated in FIGS. 1 and 2;

FIG. 9 is an exploded view of the termination of the lining around a man-way;

FIG. 10 is a schematic illustration of a partially lined tank showing a joint between sections of lining material;

DETAILED DESCRIPTION OF THE PREFERRED EMBODIMENTS

Figure 1:
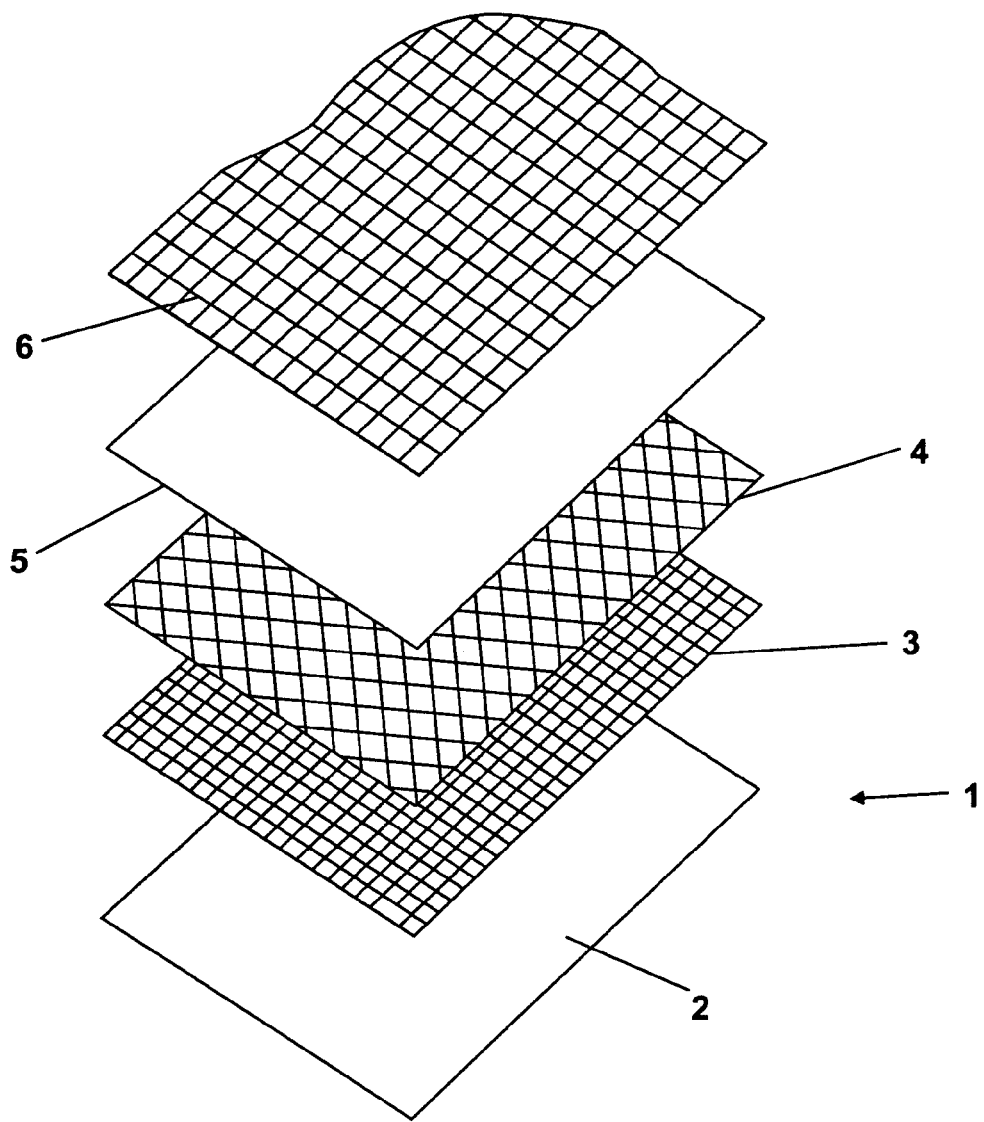
FIG. 1 is an exploded view of a fluid impervious composite material according to the invention.
Figure 2:
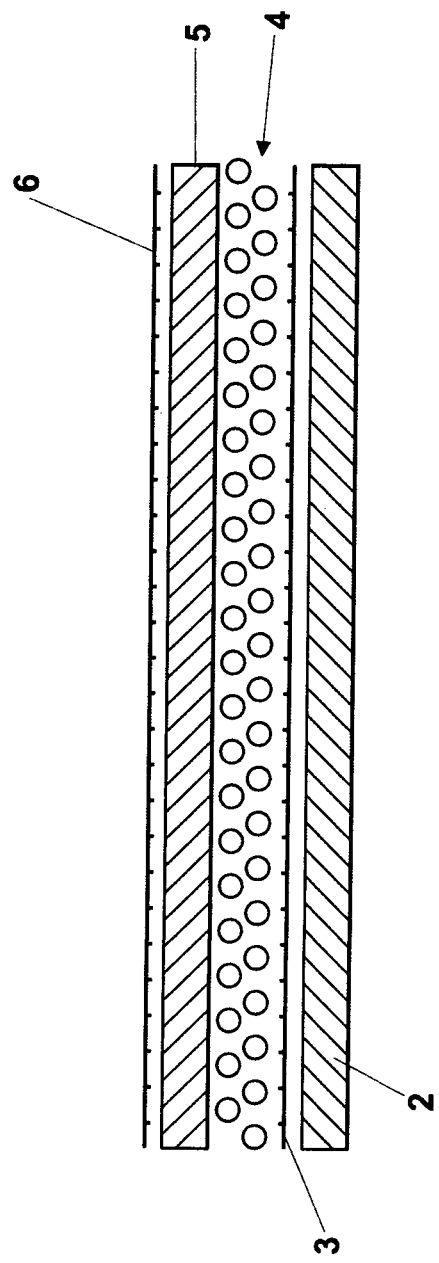
FIG. 2 is a cross-sectional elevation of the material illustrated in FIG. 1.

Referring now to FIGS. 1 and 2, a composite material 1 comprises a layer of flexible material 2 coated with adhesive on both sides thereof. In the present example the flexible material is a paper impregnated with adhesive. Each side of the flexible material 2 is typically covered with a layer of peel-off material which when peeled off reveals the sticky surface. With the peel-off material removed a layer of scrim 3 comprising a mesh, which in the example is a fibre glass scrim, is attached to one surface of the flexible material 2. In the example an adhesive is applied to the scrim thereby providing for excellent adhesion between the scrim 3 and the flexible material 2, although good adhesion could be obtained relying only on the adhesive applied to the surface of the flexible material 2. As an alternative, in this or any other embodiment of the invention, the scrim 3 may be formed from a polymer such as a polyester, or a polyethylene. The advantage of forming the scrim 3 of a polymer is that the material rolls up better than would a fibre glass material.

The third layer of the composite material 1 is non-woven grid 4 which is pressed onto the scrim layer 3. The non-woven grid is open and highly permeable, and in the present example a thermoplastic. A fourth layer of the composite material 1 is formed by a fluid impervious layer 6 comprising a foil sheet and is applied to the upper surface of the non-woven grid 4 following removal of a peel off layer 5 of the said fluid impervious layer. The foil sheet includes on its side which is applied to the non-woven grid 4 a second scrim in the form a grid material, which in the present example is formed of fibre glass or a polymer such as polyester. In the present example the material used to form the fluid impervious layer 6 includes the second scrim. However, the fluid impervious layer may be fabricated by applying the scrim to the foil, or vice versa, with a suitable adhesive. The textile grid 4 is therefore encapsulated within the composite material 1. The interstitial space of the composite material 1 is formed by the non-woven grid 4. The grid 4 is formed by two arrays of elongate elements arranged at an angle to each other, with the elements of each respective array lying in a different plane and thereby allowing for the free passage of fluid (for example air) through the grid. In the present example the grid 4 is formed from high density polyethylene (HDPE).

Figure 5:
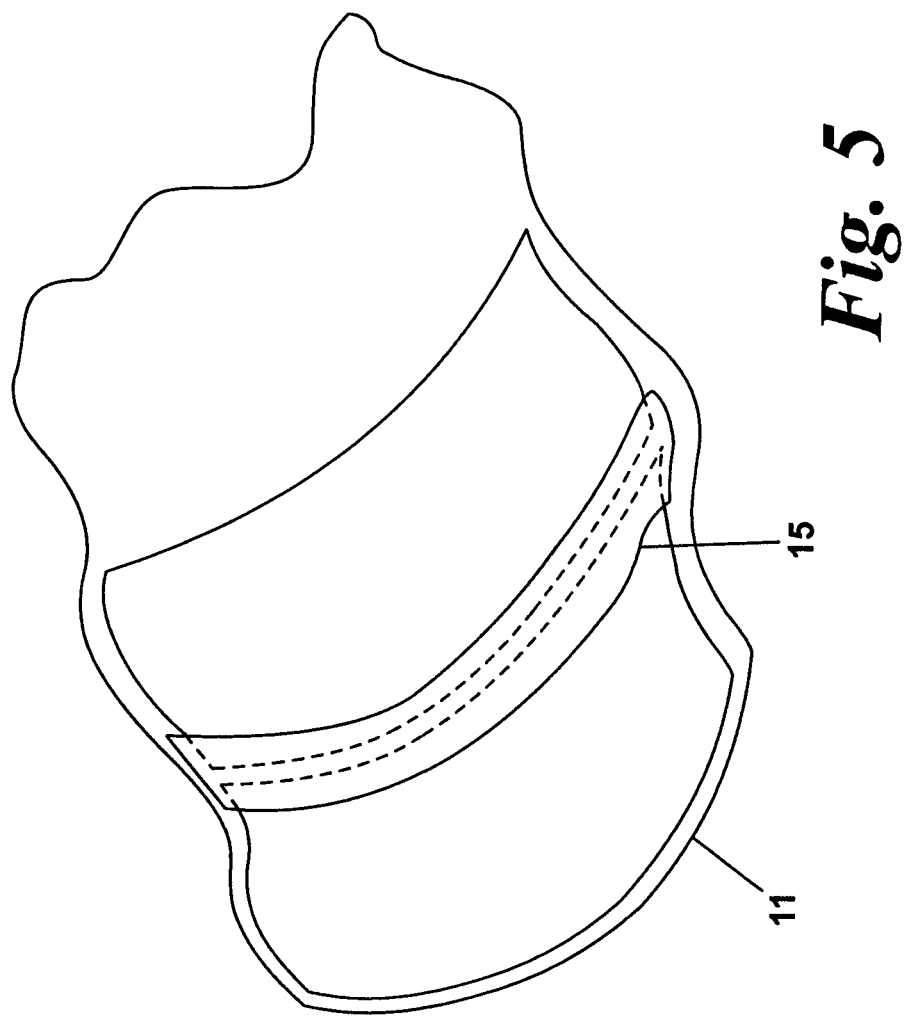
FIG. 5 is a schematic illustration of a partially lined tank showing a joint between sections of lining material.

FIGS. 3 to 5 illustrates a tank lined with the composite material 1. The tank 10 includes a hull 11 which is provided with a man-way 12. The tank 10 is lined with a liner 13 comprising a number of pieces of composite material 1, and a surface coating 14. As is best illustrated in FIG. 5, the composite material 1 is applied to the inner surface of the hull 11 in sheets. Butt joints are made between adjacent sheets of composite material 1. It is desirable that accurate butt joints should be formed between adjacent sheets of composite material 1. This is achieved by attaching the composite sheets to the hull such that adjacent sheets overlap, for example by approximately 50 mm. To form the butt joint, the overlapping excess is removed. The resulting butt joints are then covered with an adhesive, such as a two component epoxy adhesive of the type which becomes adhesive and begins to cure upon mixing together two components. A metallic foil tape 15 is then applied over the butt joints.

When the sheets of composite material 1 have been correctly joined together a vacuum is applied to the interstitial space made by the textile grid 4 between the fluid impervious layer 6 and the inner surface of the flexible material 2. This pulls all the layers of material onto the hull 11. A surface coating 14 in the form of a sealant is then applied to the fluid impervious layer 6. The sealant is itself fluid impervious when cured. In the example the sealant material may be an epoxy sealer (preferably solvent free) which sets hard when cured and is resistant to chemical attack by corrosive fluids such as petrol, biofuel, etc. Alternatively, where less corrosive materials are to be stored the sealant may be a urethane sealant, which is preferably solvent free. Where the surface coating 14 is an epoxy sealer, the coating is applied in layers until a smooth surface is achieved, i.e. the fibres of the scrim are covered. During the process of applying the coating, if a permeation is detected more sealant is applied. Similarly, where the surface coating 14 is urethane the coating is applied until a smooth surface is achieved, which is usually accomplished with one coat having a thickness of two to five mm.

The surface covering 14 may comprise two layers. The presence of two layers may provide for a more even finish to the surface of the covering 14 facing into the tank. In the example a first sealant, which is epoxy based is applied to the fluid impervious layer 6. This first sealant is a semiviscous liquid which is applied with a brush or roller, in the same manner as paint might be applied with a brush or roller. This first sealant keys to the grid of the fluid impervious layer 6 (which is described in greater detail with reference to FIG. 1) leaving a surface to which a layer of epoxy based sealant may be applied in spray form. The second layer of sealant keys to and chemically bonds with the first layer. When the first and second layer of the sealant have cured the surface coating 14 provides a hard inner shell to the tank 10.

The sealant may be applied in more than two coats, for example four coats of sealant may be used, which may comprise a wetting coat (preferably applied by brush or roller), two coats (each of about 1 mm thickness) of semi-viscous sealant (preferably applied by brush or roller) and a final coat (preferably applied with a spray gun to a thickness of approximately 0.5 to 1.0 mm). Each coat may be of an epoxy based material, which typically is comprised of two parts, a base and an activator which are mixed together just prior to application. In order to simplify the application of the different coats of sealant, each coat may be of a different colour, for example the first coat may be any colour other than grey, the second coat may be grey, the third coat black and the final coat grey. In this way the person applying the sealant can easily see which parts of the lining have been sealed and which haven't. This arrangement of sealant is particularly useful where the top layer of a tight or close weave material, such as the fibre glass material described above. It has be found that the two thick coats may be replaced by one thick coat with little effect on performance and hence the invention extends to the sealant being applied in three coats as described above, but with a single thick coat being used instead of two coats of the same material. The afore-mentioned epoxy based materials are not in themselves new.

The tank 10 includes a man-way 12. The lining is terminated at the man-way by the sealant forming the surface coating 14. A ring on the inside of the hull 11 surrounding and immediately adjacent to the man-way 12 is formed. The area formed by the ring is covered only by the surface coating 14, not the composite sheet.

When the liner 13 is applied to the inner surface of the hull 11 an interstitial space is made by the non-woven grid 4 between the fluid impervious layer 6 and the inner surface of the flexible material 2. The integrity of the interstitial space may be monitored using any suitable monitoring equipment, such as a vacuum monitoring system.

In order to improve the effectiveness of adhesion of the fluid impervious layer 6 to the non-woven grid 4 an adhesive may be sprayed over the surface of the fluid impervious layer 6 revealed by pulling off the peel off layer 5 prior to attachment thereof to the non-woven grid 4.

Rather than applying a composite material 1 to the hull, the lining may be made up as it is applied to the hull, i.e. the flexible material 2 is being applied first, then the scrim layer 3, followed by the non-woven grid 4, followed by the fluid impervious layer 6, which layer may itself be made up prior to application to the hull or during application to the hull, i.e. the scrim providing the grid formation may be an integral part of the fluid impervious layer 6, or the scrim may be applied to the surface of the non-woven grid 4 followed by a layer of fluid impervious material.

Referring to FIG. 3 when lining a tank in which a corrosive liquid such as petrol is to be stored it is necessary to line the tank fully. To ensure a secure attachment of the lining material to the upper region of the tank holes may be cut in the layer of flexible material 2 and spots of an adhesive, such as an epoxy adhesive, used to attach the non-woven grid directly to the inner hull of the tank. Advantageously a roller is used to press the composite material onto the spots of adhesive.

The lining system of the invention is simple to use in that the sheet materials are sufficiently flexible to be rolled or folded. This is a significant advantage when lining the inside of a tank where access is gained via a man-way of limited dimension. Further, the materials of the system are easy to work with and do not pose significant dangers to workers installing the system. The simplicity of the system allows for fast installation which is a requirement when re-lining tanks at petrol stations. The final coating of curable material ensures the integrity of the lining.

Figure 6:
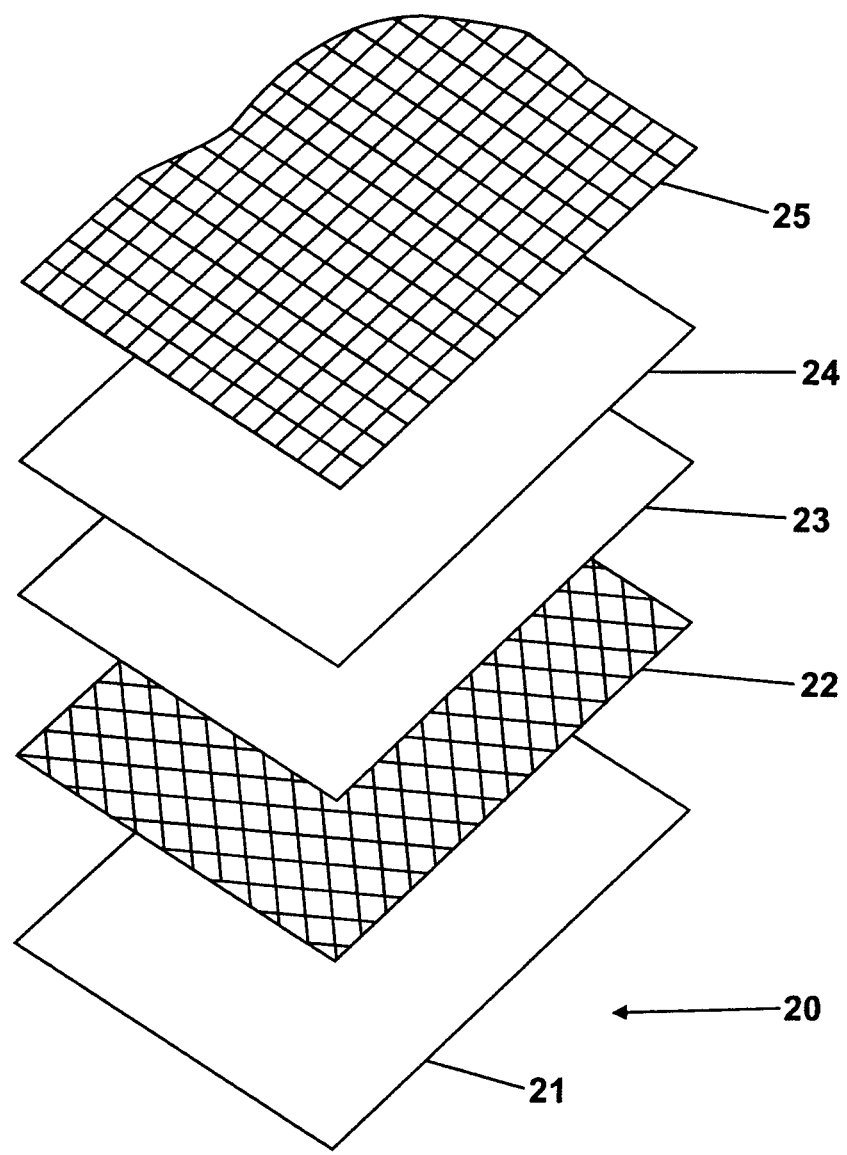
FIG. 6 is an exploded view of a fluid impervious composite material according to a second embodiment of the invention.
Figure 7:
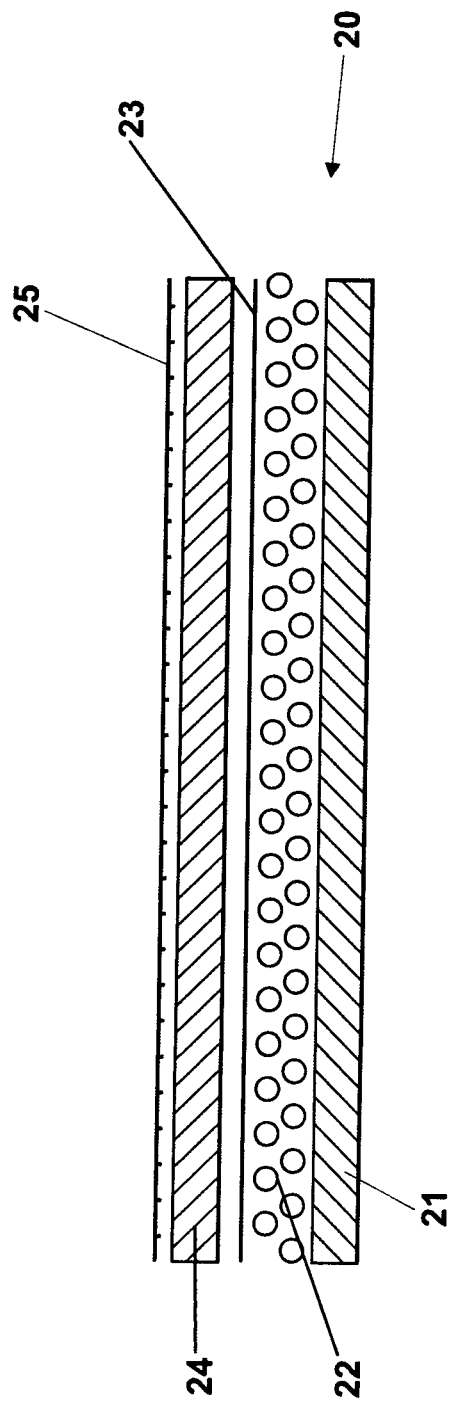
FIG. 7 is a cross-sectional elevation of the material illustrated in FIG. 1.

Referring now to FIGS. 6 and 7, a composite material 20 comprises a first layer of flexible material 21 having adhesive on both sides thereof. In the present example the flexible material is a paper impregnated with adhesive. The underside of the flexible material 21 is covered with a peel off material until such time as the material 20 is to be applied to a surface. A non-woven grid material 22 is attached to the upper surface of the material 21 by means of the adhesive of the said first layer. A fluid impervious layer 23 of metallic foil, in the present example aluminium foil, having an adhesive on the surface thereof facing the non-woven grid material 22 is attached to the upper surface of the said non-woven grid material 22. To the upper surface of the layer 23 is attached a further layer of a material 24 having adhesive on both sides thereof. To the upper surface of the layer of material 24 a layer 25 of fibre glass scrim is attached by means of the adhesive of the said layer 24. To facilitate attachment of the layer 25 to the layer 23, in place of the layer of material 24, the upper surface of the layer 23 and/or the underside of the layer 25 may be provided with an adhesive coating.

The fibre glass scrim layer 25 illustrated in FIG. 6 is indicated as having an open weave. This scrim layer may be replaced with a tight or closed weave material, which may be attached to the layer 23 either by means of the layer of material 24 or adhesive carried on the underside of the layer 25. Using a material having a tight or closed weave results in less "pin-holing" upon application of sealant to the surface of the said material. Whilst the scrim layer has been described as being of fibre-glass, other materials could be used, whether woven or non-woven. For example, the vinyl material described with reference to FIG. 12 might be employed for certain applications.

FIGS. 8 to 10 illustrate a tank lined with the composite material 20. The tank 30 includes a hull 31 which is provided with a man-way 32. The tank 30 is lined with a liner 33 of composite material 20, and a surface coating 34. As is best illustrated in FIG. 10, the composite material 20 is applied to the inner surface of the hull 31 either in sheets comprising a number of layers thereof, or layer by layer. The fluid impervious layer 23 is applied such that the edge of one sheet of the fluid impervious layer 23 overlaps (for example by approximately 50 mm) the adjacent sheet of the fluid impervious layer 23. Overlapping of the edges of sheets making up the fluid impervious layer 23 ensures a continuous fluid impervious barrier. In addition, prior to application of the scrim layer 25, fluid impervious material may be attached to the upper surface of the fluid impervious layer to cover any overlaps in the fluid impervious layer 23. This fluid impervious material may be the same material as that of fluid impervious layer 23, and further may be in the form of a strip. However the butt jointing procedure described with reference to FIG. 5 could be used.

As described above with reference to FIGS. 1 to 5, the composite material described with reference to FIGS. 6 to 11 could be made up in situ in the tank or on site prior to introduction into the tank or sheets including some layers of the composite may be made up prior to introduction into the tank, with final layers, such as the fluid impervious layer and the scrim layer being applied in situ in the tank.

In one method of lining a tank the upper half of the tank is lined first, for example with the aid of staging, such as that described in United Kingdom patent application number 0419829.7 or United Kingdom patent application number 0715027.9. The lower half of the tank is then lined, typically starting at one end or both ends of the tank and working towards the man-way in order that the least amount of lining material is walked on.

When the sheets of composite material 20 have been correctly joined together a vacuum is applied to the interstitial space made by the non-woven grid 22 between the fluid impervious layer 23 and the inner surface of the flexible material 21. This pulls all the layers of the composite material 20 onto the hull 31. A surface coating 34 in the form of a sealant is then applied to the scrim layer 25. The sealant is itself fluid impervious when cured. In the example the sealant material may be an epoxy sealer (preferably solvent free) which sets hard when cured and is resistant to chemical attack by corrosive fluids such as petrol, biofuel, etc. Alternatively, where less corrosive materials are to be stored the sealant may be a urethane sealant, which is preferably solvent free. Where the surface coating 14 is an epoxy sealer, the coating is applied in layers until a smooth surface is achieved, i.e. the fibres of the scrim are covered. During the process of applying the coating, if a permeation is detected more sealant is applied. Similarly, where the surface coating 14 is urethane the coating is applied until a smooth surface is achieved, which is usually accomplished with one coat having a thickness of two to five mm.

The surface covering 34 may comprise two layers. The presence of two layers may provide for a more even finish to the surface of the covering 34 facing into the tank. In the example a first sealant, which is epoxy based is applied to the scrim layer 25. This first sealant is a semi-viscous liquid which is applied with a roller, in the same manner as paint might be applied with a roller. This first sealant keys to the grid of the scrim layer 25 (which is described in greater detail with reference to FIG. 1) leaving a surface to which a layer of epoxy based sealant may be applied in spray form. The second layer of sealant keys to and chemically bonds with the first layer. When the first and second layer of the sealant have cured the surface coating 34 provides a hard inner shell to the tank 30. As described with reference to FIGS. 1 to 5 above, the surface covering may comprise more than two layers, for example three of four layers. In particular, where the scrim layer 25 is of a tight or close weave it is advantageous to apply a wetting layer prior to the application of the semi-viscous sealant.

The tank 30 includes a man-way 32. The lining is terminated at the man-way by the sealant forming the surface coating 34. A ring on the inside of the hull 31 surrounding and immediately adjacent to the man-way 32 is formed. The area formed by the ring is covered only by the surface coating 34, not the composite sheet.

When the liner 33 is applied to the inner surface of the hull 31 an interstitial space is made by the non-woven grid 22 between the fluid impervious layer 23 and the inner surface of the flexible material 21. The integrity of the interstitial space may be monitored using any suitable monitoring equipment, such as a vacuum monitoring system.

Figure 11:
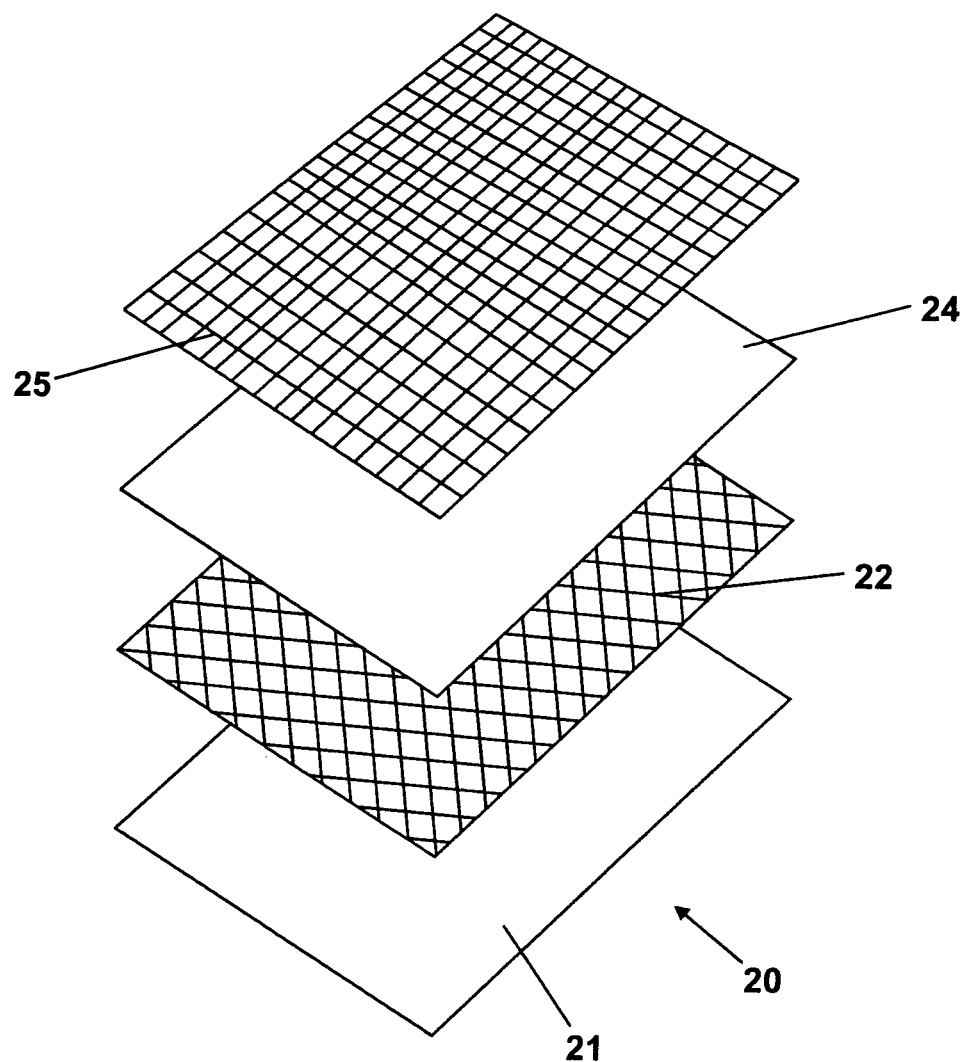
FIG. 11 illustrates a composite material according to a third aspect of the invention.

In FIG. 11, the impermeable layer 23 is omitted. Such a lining 20 may be used where the tanks are used to store less penetrating fluids such as diesel, water, or food products.

Figure 12:
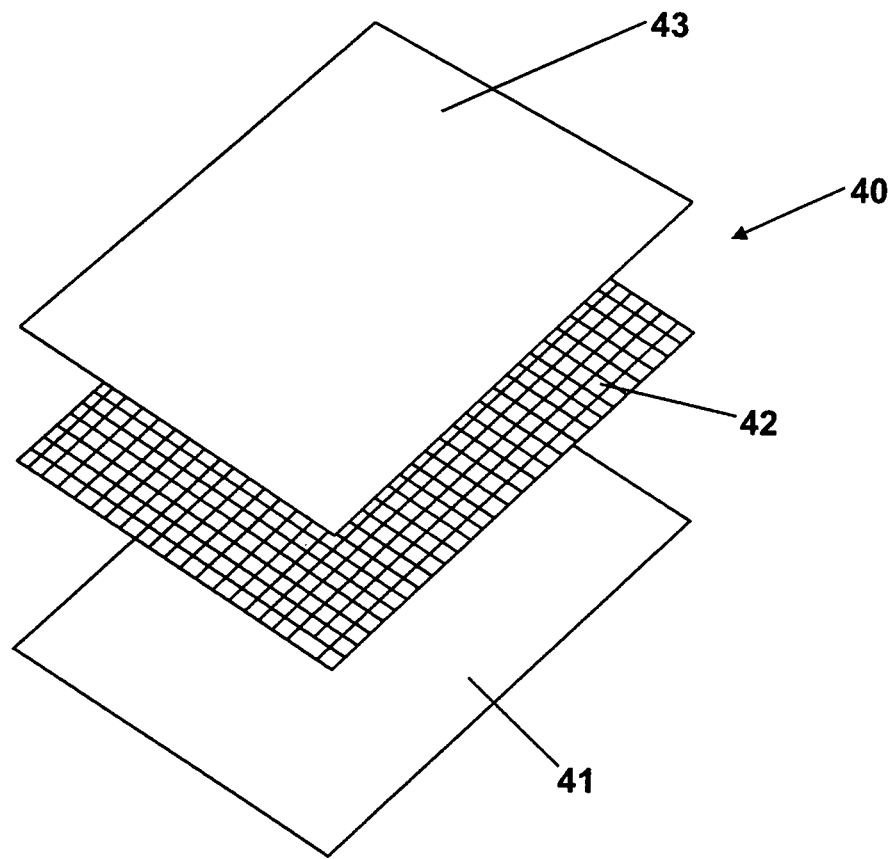
FIG. 12 illustrates a composite material according to a fourth aspect of the invention.

Referring now to FIG. 12, the lining 40 comprises a layer 41 of flexible material having adhesive on both sides thereof, a layer 42 comprising a non-woven grid and a layer of fluid impervious material 43, which in the present example is a vinyl film having adhesive on one side thereof, i.e. the side facing the non-woven grid. The surface of the vinyl film is preferably slightly rough. In use, when the sealing coat is applied, the roughness of the surface of the vinyl film provides for better adhesion of the sealer (which may be epoxy, urethane or any other suitable sealant) to the film than does a smooth surface.

Figure 13:
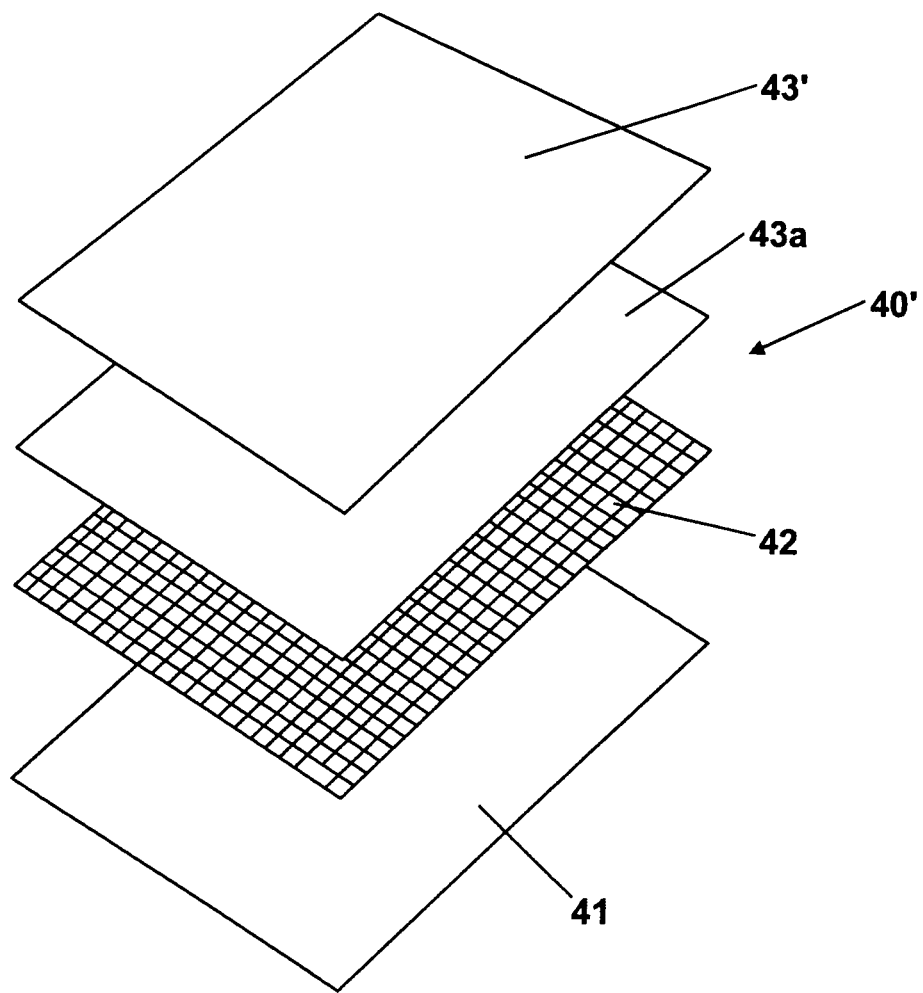
FIG. 13 illustrates a composite material according to a fifth aspect of the invention.

The lining 40' illustrated in FIG. 13 includes an additional layer 43a. This is a layer of flexible material having adhesive on each surface thereof. Where this layer is used the vinyl film 43' may or may not be provided with adhesive on the side facing the layer 43a as it is the adhesive of the said layer 43a which attaches the vinyl film 43 to the non-woven grid 42.

The layer of impervious material could be formed from another film, or a product which is applied in liquid form, which is flexible as it is applied, and which may be sprayed or poured onto the layer 42 or layer 43a of flexible material. For example an instant or fast setting polyurea may be used. The speed of setting and surface tension due to the mesh size of layer 42 and the viscosity of the liquid used to form layer 43 ensure that the voids in the mesh are not filled.

The linings 40 and 40' are suitable for use with fluids such as diesel, water or foodstuffs, which are not penetrative in the same way as petrol is. The vinyl of the linings 40 and 40' performs better than foil from an installation perspective. It is much less likely to tear when walked on than aluminium foil and therefore much less repair is required prior to application of the sealing fluid. Also, because fewer holes are made in the lining during its application to a tank, pulling the vacuum on the lining prior to application of the sealing fluid is simpler.

The lining materials 40, 40' do not include a reinforcing scrim layer. The strength of the vinyl film means that for most applications such a scrim layer is not required. However, there may be applications where increased strength is desirable in which case a reinforcing scrim layer may be added. Where a reinforcing layer is used is over the joints between adjacent sections of material 40, 40'. Typically, a fibreglass scrim (of the type forming the layers 3 and 6 in the embodiment of FIG. 1) layer is used.

Sheets of material 40 are applied to the inner surface of the hull of a tank using the same procedure as described with reference to FIG. 5, except that when the butt joints have been formed, instead of covering the joints with foil, the joints are covered with either the vinyl of the layers 43, 43' or a reinforcing scrim, such as a fibreglass or polymer scrim.

In the examples paper impregnated with adhesive is identified as a suitable flexible material for attachment to the inner surface of the tank and for use between other layers of the composite material for the purpose of attaching the said layers together. Another suitable material is an impervious film, such as a plastics material, coated with adhesive, such as the vinyl material described in relation to FIGS. 12 and 13.

By using a layer of impervious film between the inner surface of the tank and the surface of the non-woven grid facing the tank, the lining can be protected against perforations in the tank. If a paper based flexible material is used water infiltrating through the outer wall of the tank may cause the lining lift off the tank wall.

Further, using a layer of plastics material between the non-woven grid and the impervious foil layer can assist in preventing damage to the foil layer. Alternatively, damage to the foil layer may be alleviated by selecting a heavy gauge of foil.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise each feature disclosed is one example of a generic series of equivalent or similar features.

The invention claimed is:

1. A fluid impervious composite material comprising:
   (i) a first layer of flexible sheet material;
   (ii) a spacer layer attached to the first layer of flexible sheet material; and
   (iii) a second layer of flexible sheet material comprised of a flexible fluid impervious foil sheet situated between a fluid impervious curable coating and the spacer layer; wherein:
   the spacer layer provides an interstitial space between the first and second layers of flexible sheet material;
   a reinforcement layer is located to the side of the flexible fluid impervious foil sheet material distal from the spacer;
   the layers of the composite material have surfaces and are attached one to the other surface to surface by adhesive between adjacent layers; and
   the fluid impervious curable coating attached to the reinforcement layer, wherein the fluid impervious coating is not flowable in liquid form when cured.

2. The fluid impervious composite material defined in claim 1, wherein the flexible material is selected from the group consisting of paper, paper coated with adhesive, paper impregnated with adhesive, plastics film, and plastics film coated with adhesive.

3. The fluid impervious composite material defined in claim 1, wherein the spacer is a permeable membrane.

4. The fluid impervious composite defined in claim 1, wherein the flexible fluid impervious foil sheet material is selected from the group comprising a metallic foil and a vinyl foil.

5. The fluid impervious composite defined in claim 1, further comprising at least one additional layer of reinforcing material.

6. The fluid impervious composite defined in claim 1, wherein the reinforcement layer is in the form of a scrim, the scrim being a woven material.

7. The fluid impervious composite defined in claim 6, wherein the woven material is selected from the group consisting of an open weave, a tight wave, and a closed weave.

8. The fluid impervious composite material defined in claim 1, wherein:
   the first flexible sheet material layer has first and second surfaces;
   the spacer layer has a first surface and a second surface, the first surface facing and being attached surface to surface by an adhesive therebetween to one of the first and second surfaces of the first flexible sheet material layer;
   the layer of flexible fluid impervious foil sheet material has first and second surfaces, the first surface of the fluid impervious foil sheet material being attached surface to surface by adhesive there between to the second surface of the spacer layer;
   the reinforcement layer has first and second surfaces, the first surface of the reinforcement layer being attached surface to surface by adhesive there between to the second surface of the layer of flexible fluid impervious foil sheet material; and
   the fluid impervious curable coating attached to the second surface of the reinforcement layer, wherein the fluid impervious coating is hard when cured.

9. A tank having a lining of a fluid impervious composite material comprising:
   a tank having an inner surface; and
   a lining of a fluid impervious composite material attached to the inner surface of the tank, the lining of a fluid impervious composite material including:
   (i) a first layer of flexible sheet material having on at least one side thereof;
   (ii) a spacer layer attached to the first layer of flexible sheet material; and
   (iii) a second layer of flexible sheet material comprised of a flexible fluid impervious foil sheet situated between a fluid impervious curable coating and the spacer layer; wherein:
   the spacer layer provides an interstitial space between the first and second layers of flexible sheet material;
   a reinforcement layer is located to the side of the flexible fluid impervious foil sheet material distal from the spacer;
   the layers of the composite material have surfaces and are attached one to the other surface to surface by adhesive between adjacent layers;
   the surface of the first layer of flexible sheet material is attached to the inner surface of the tank by adhesive therebetween; and
   the fluid impervious cured coating is attached to the reinforcement layer, wherein the fluid impervious cured coating is not flowable in liquid form when cured.

10. The tank defined in claim 9, wherein the first flexible sheet material layer is formed from one of the group consisting of paper, paper coated with adhesive, paper impregnated with adhesive, plastics film, and plastics film coated with adhesive.

11. The tank defined in claim 9, wherein the spacer layer is formed from a permeable membrane.

12. The tank defined in claim 9, wherein the flexible fluid impervious foil sheet material is selected from the group comprising a metallic foil and a vinyl foil.

13. The tank defined in claim 9, further comprising at least one additional layer of reinforcing material.

14. The tank defined in claim 9, wherein the reinforcement layer is in the form of a scrim, the scrim being a woven material.

15. The tank defined in claim 14, wherein the woven material is selected from the group consisting of an open weave, a tight wave, and a closed weave.

16. The tank defined in claim 9, wherein the:
   the first flexible sheet material layer has first and second surfaces;
   the spacer layer has a first surface and a second surface, the first surface facing and being attached surface to surface by adhesive there between to one of the first and second surfaces of the first flexible sheet material layer;

the layer of flexible fluid impervious foil sheet material has first and second surfaces, the first surface of the fluid impervious foil sheet material being attached surface to surface by adhesive there between to the second surface of the spacer layer;

the reinforcement layer has first and second surfaces, the first surface of the reinforcement layer being attached surface to surface by adhesive there between to the second surface of the layer of flexible fluid impervious foil sheet material; and the fluid impervious cured coating attached to the second surface of the reinforcement layer, wherein the fluid impervious coating is hard.

* * * * *